(12) United States Patent
Aki

(10) Patent No.: US 12,222,029 B2
(45) Date of Patent: Feb. 11, 2025

(54) METHOD OF MANUFACTURING FLEXIBLE GEAR, METHOD OF MANUFACTURING FLEXIBLE GEAR UNIT, AND GEAR

(71) Applicant: SONY CORPORATION, Tokyo (JP)

(72) Inventor: Yuichi Aki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 1009 days.

(21) Appl. No.: 17/051,845

(22) PCT Filed: Mar. 25, 2019

(86) PCT No.: PCT/JP2019/012293
§ 371 (c)(1),
(2) Date: Oct. 30, 2020

(87) PCT Pub. No.: WO2019/216039
PCT Pub. Date: Nov. 14, 2019

(65) Prior Publication Data
US 2021/0231207 A1 Jul. 29, 2021

(30) Foreign Application Priority Data
May 8, 2018 (JP) .................................. 2018-090247

(51) Int. Cl.
*F16H 55/06* (2006.01)
*C25D 1/10* (2006.01)
*F16H 49/00* (2006.01)

(52) U.S. Cl.
CPC ............... *F16H 55/06* (2013.01); *C25D 1/10* (2013.01); *F16H 49/001* (2013.01); *F16H 2055/065* (2013.01)

(58) Field of Classification Search
CPC .. F16H 55/06; F16H 49/001; F16H 2055/065; F16H 55/0833; F16H 2049/003; C25D 1/10; C25D 1/02; C25D 1/08
See application file for complete search history.

(56) References Cited

U.S. PATENT DOCUMENTS 4,042,443 A * 8/1977 Hoback ................. B29D 29/08
428/161

FOREIGN PATENT DOCUMENTS

CN 101561031 A 10/2009
CN 103962423 A 8/2014
(Continued)

OTHER PUBLICATIONS

English Translation of JP 2006-71503 (Year: 2006).*
(Continued)

*Primary Examiner* — Victor L MacArthur
(74) *Attorney, Agent, or Firm* — CHIP LAW GROUP

(57) ABSTRACT

A method of manufacturing a flexible gear and a method of manufacturing a flexible gear unit that can achieve a further improvement in productivity and a further reduction in production cost, and a gear that allows a further improvement in productivity and a further reduction in production cost are provided. A method of manufacturing a flexible gear is provided which includes preparing a matrix with a flexible gear shape, and forming, by an electroforming method using the matrix, a flexible gear shape with predetermined thickness and releasing the flexible gear shape from the matrix. A method of manufacturing a flexible gear unit is provided which includes the method of manufacturing the flexible gear according to the present technology, and joining a shaft and/or a hub to the flexible gear. Further, a gear is provided which includes a gear part, a body part, and a diaphragm part, is made from a material suitable for an electroforming method, and has flexibility.

13 Claims, 13 Drawing Sheets

(56) References Cited

FOREIGN PATENT DOCUMENTS

| | | | |
|---|---|---|---|
| CN | 105402363 A | | 3/2016 |
| CN | 106461038 A | | 2/2017 |
| CN | 107559403 A | | 1/2018 |
| EP | 0202799 A2 | | 11/1986 |
| JP | 02-072260 A | | 3/1990 |
| JP | 2003-097654 A | | 4/2003 |
| JP | 2004294352 A | * | 10/2004 |
| JP | 2006071503 A | * | 3/2006 |
| JP | 2017-515059 A | | 6/2017 |
| JP | 2017-137881 A | | 8/2017 |
| KR | 10-2016-0145668 A | | 12/2016 |
| WO | 2015/156797 A1 | | 10/2015 |

OTHER PUBLICATIONS

English Translation of JP 2004-294352 (Year: 2004).*
International Search Report and Written Opinion of PCT Application No. PCT/JP2019/012293, issued on Jun. 4, 2019, 08 pages of ISRWO.

* cited by examiner

FIG. 2

| MATERIAL NAME | ALUMINUM ALLOY | TOOL STEEL | STRUCTURAL CARBON STEEL | NICKEL | NICKEL-COBALT |
|---|---|---|---|---|---|
| MATERIAL MARK | A7075 | SKD 6 | S45C | Ni (ELECTROFORMING) | Ni-25%Co |
| HARDNESS (HV) | 160HB | 229HBW | 201 TO 269HBW | 200 TO 250 | 450 TO 500 |
| TENSILE STRENGTH (Mpa) | 573 | 1550 | 690 TO 828 | 550 TO 570 | 1300 TO 1500 |
| ELONGATION (%) | 11 | — | 17 TO 20 | 17 TO 20 | 0.5 TO 1.5 |
| YOUNG'S MODULUS (Gpa) | 72 | 206 | 205 | 185 | 192 |
| LINEAR THERMAL EXPANSION COEFFICIENT (×10$^{-6}$/k) | 23.6 | 12 | 12.1 | 12.5 TO 13.0 | 11.0 TO 11.5 |
| HEAT TRANSFER COEFFICIENT (W/(m·k)) | 237 | 28.8 | 45 | 90.5 | — |
| SPECIFIC GRAVITY | 2.8 | 7.75 | 7.8 | 8.9 | — |

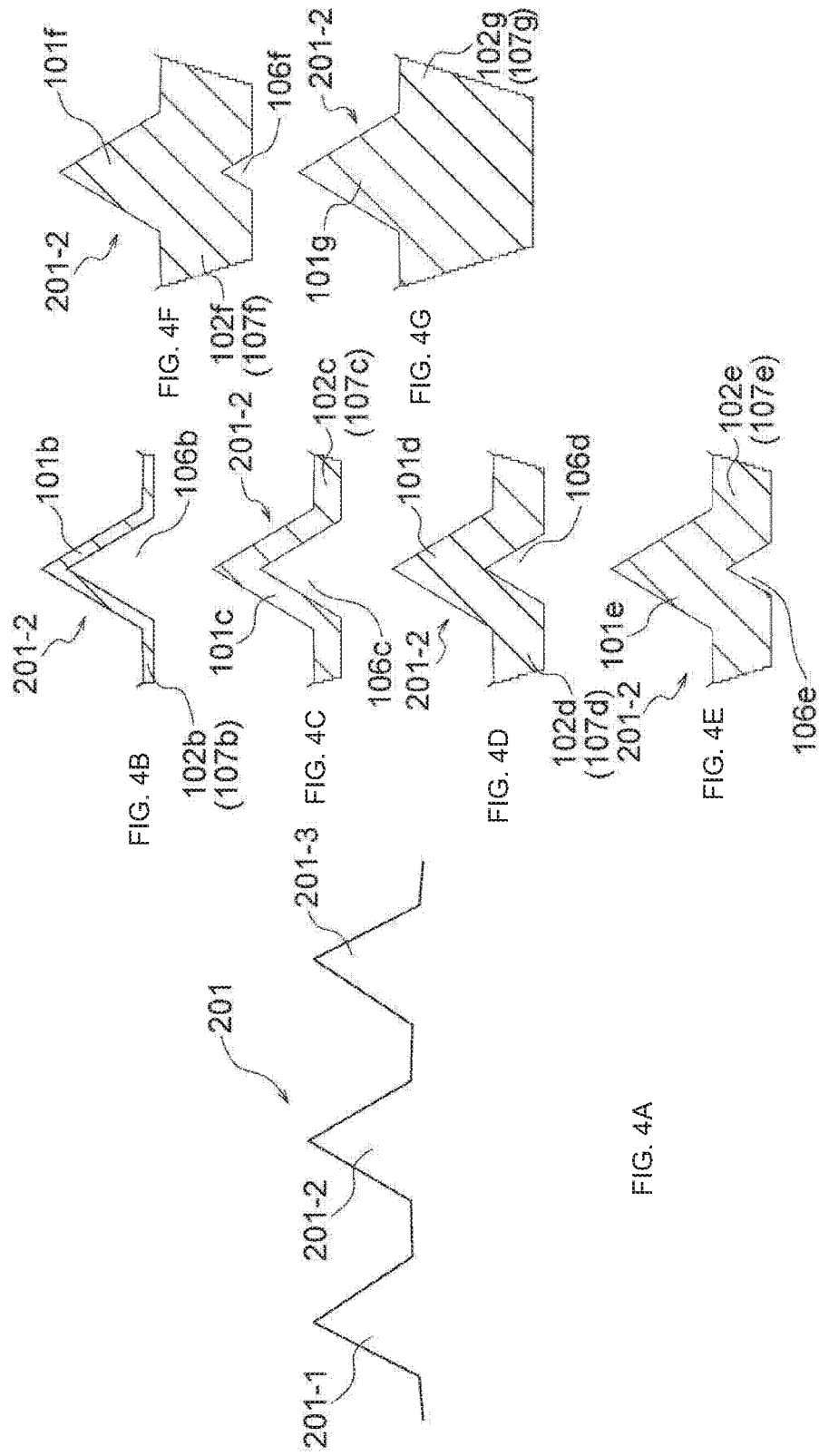

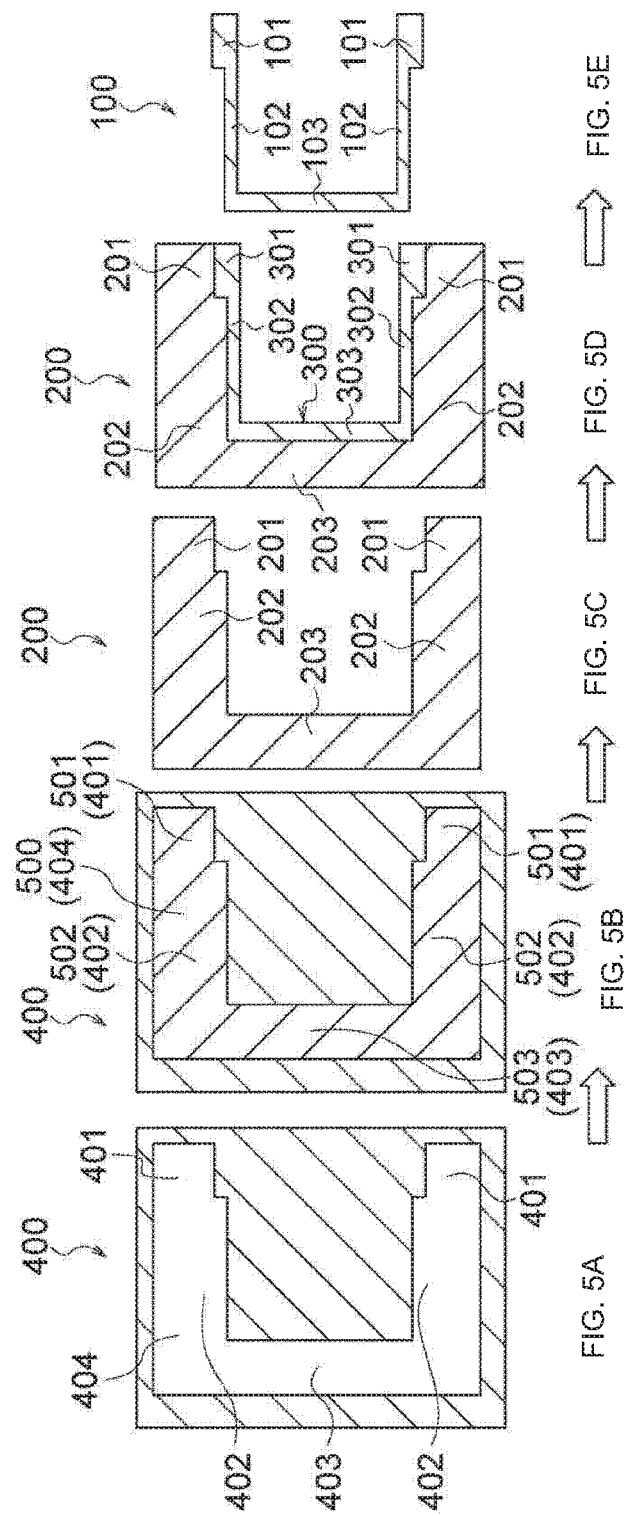

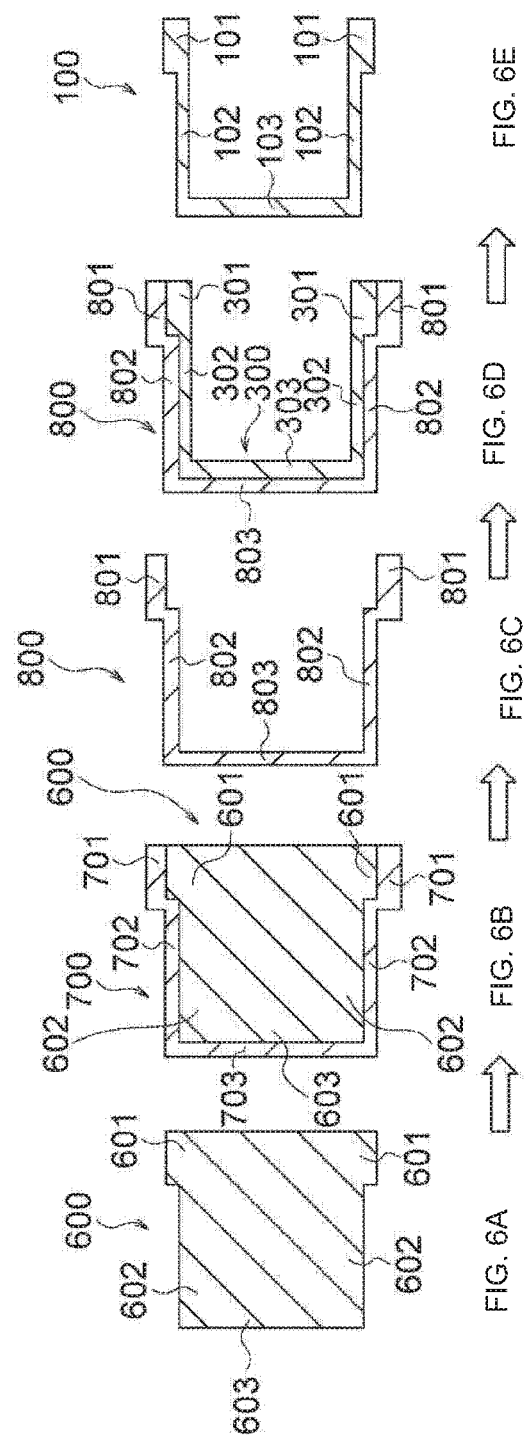

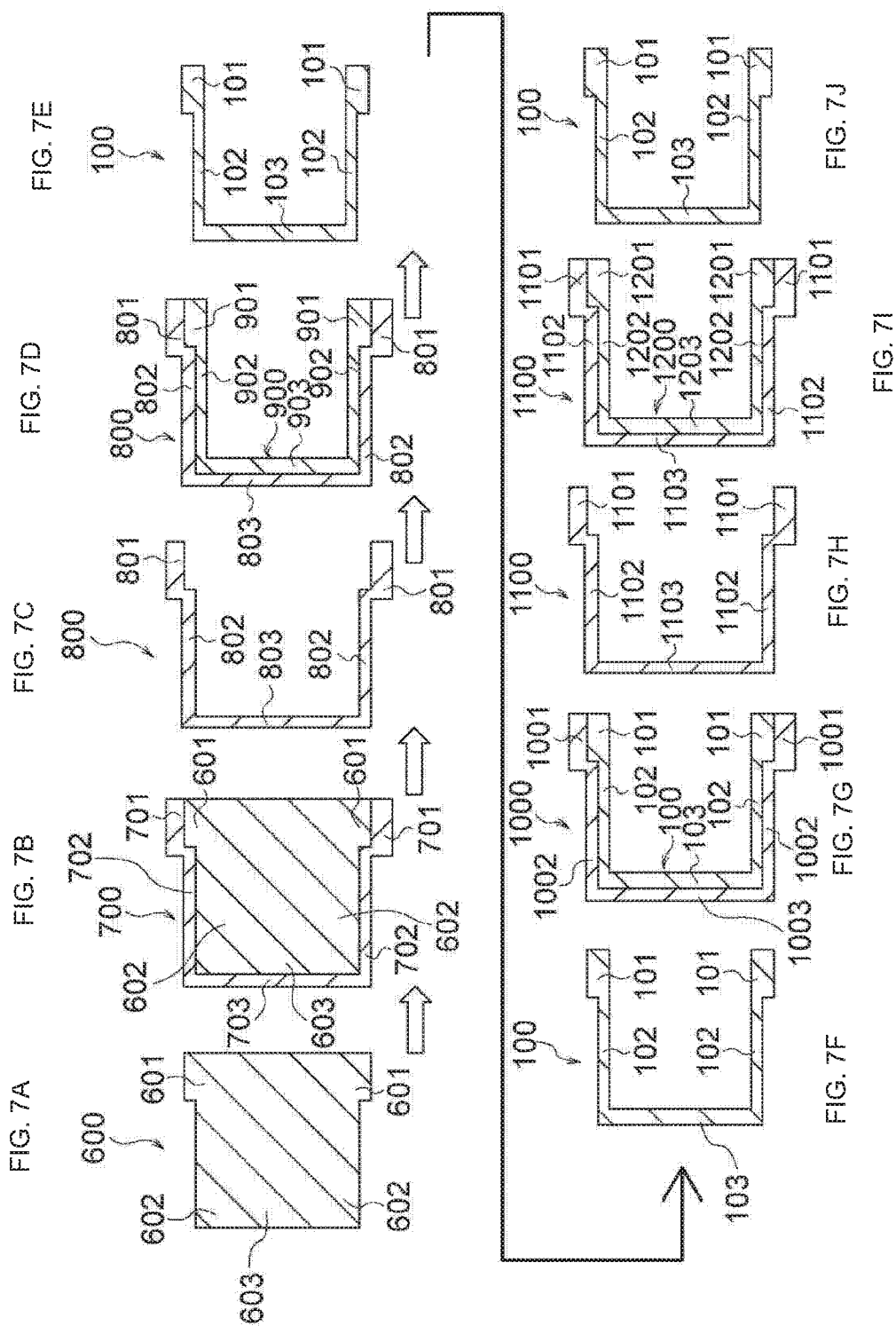

METHOD OF MANUFACTURING FLEXIBLE GEAR, METHOD OF MANUFACTURING FLEXIBLE GEAR UNIT, AND GEAR

CROSS REFERENCE TO RELATED APPLICATIONS

This application is a U.S. National Phase of International Patent Application No. PCT/JP2019/012293 filed on Mar. 25, 2019, which claims priority benefit of Japanese Patent Application No. JP 2018-090247 filed in the Japan Patent Office on May 8, 2018. Each of the above-referenced applications is hereby incorporated herein by reference in its entirety.

TECHNICAL FIELD

The present technology relates to a method of manufacturing a flexible gear, a method of manufacturing a flexible gear unit, and a gear.

BACKGROUND ART

Harmonic drive speed reducers can be formed with a small number of components in a relatively small size with a high reduction ratio and a small backlash. Furthermore, harmonic drive speed reducers allow input and output shafts to be provided coaxially. Thus, their use is becoming wider as rotation control equipment, mainly as medium- and small-sized speed reducers for machine tools, industrial robots, etc. Harmonic drive speed reducers use a flexible gear (flex spline). In recent years, technologies for flexible gears (flex splines) have been actively developed under present circumstances.

For example, technologies aimed at improving the structure and method of manufacturing a flexible gear (flex spline) have been proposed (see Patent Documents 1 and 2).

CITATION LIST

Patent Documents

Patent Document 1: Japanese Patent Application Laid-Open No. H2-72260
Patent Document 2: Japanese Patent Application Laid-Open No. 2003-97654

SUMMARY OF THE INVENTION

Problems to be Solved by the Invention

However, the technologies proposed in Patent Documents 1 and 2 may not be able to achieve a further improvement in productivity and a further reduction in production cost.

Thus, the present technology has been made in view of such circumstances, and has a main object of providing a method of manufacturing a flexible gear and a method of manufacturing a flexible gear unit that can achieve a further improvement in productivity and a further reduction in production cost, and a gear that allows a further improvement in productivity and a further reduction in production cost.

Solutions to Problems

As a result of earnest study to solve the above-mentioned object, the present inventor has succeeded in developing a method of manufacturing a flexible gear and a method of manufacturing a flexible gear unit that achieve a dramatic improvement in productivity and a dramatic reduction in production cost, and a gear that allows a further improvement in productivity and a further reduction in production cost, and has come to complete the present technology.

Specifically, the present technology provides a method of manufacturing a flexible gear including preparing a matrix with a flexible gear shape, and forming, by an electroforming method using the matrix, a flexible gear shape with predetermined thickness and releasing the flexible gear shape from the matrix.

In the method of manufacturing the flexible gear according to the present technology, the preparation of the matrix may include producing the matrix by machining, or may include producing the matrix by replication of a model.

In the method of manufacturing the flexible gear according to the present technology, the replication may use an injection molding method, or may use an electroforming method.

In the method of manufacturing the flexible gear according to the present technology, the matrix may include recessed portions corresponding to teeth of the flexible gear, and the teeth of the flexible gear may be formed by filling the recessed portions with a plating solution.

In the method of manufacturing the flexible gear according to the present technology, a cross-sectional shape of each recessed portion cut along a recessed direction of the recessed portion may be a substantially triangular shape.

In the method of manufacturing the flexible gear according to the present technology, the matrix may be subjected to conductive treatment, or the matrix may be subjected to masking treatment.

In the method of manufacturing the flexible gear according to the present technology, the matrix may be made from a metallic material, and a release layer may be formed on a surface of the matrix on which the flexible gear shape is formed.

In the method of manufacturing the flexible gear according to the present technology, the matrix may be made from a nonmetallic material, and a conductive layer may be formed on a surface of the matrix on which the flexible gear shape is formed.

Further, the present technology provides a method of manufacturing a flexible gear unit including the method of manufacturing the flexible gear according to the present technology, and joining a shaft and/or a hub to the flexible gear.

In the method of manufacturing the flexible gear unit according to the present technology, the joining may use an insert injection molding method.

Further, the present technology provides a gear including a gear part, a body part, and a diaphragm part, the gear being made from a material suitable for an electroforming method, and having flexibility.

In the gear according to the present technology, the diaphragm part may have an uneven shape.

Effects of the Invention

According to the present technology, a further improvement in productivity and a further reduction in production cost can be achieved. Note that the effects described here are not necessarily limiting, and any effect described in the present disclosure may be included.

BRIEF DESCRIPTION OF DRAWINGS

FIG. 2 is a table showing an example of mechanical characteristic data of typical metallic materials and electroforming materials.

FIGS. 4A, 4B, 4C, 4D, 4E, 4F, and 4G are diagrams for explaining formation of a gear part (tooth portions) of the flexible gear by electroforming.

FIGS. 5A, 5B, 50, 5D, and 5E are cross-sectional views showing an example of a method of manufacturing a flexible gear according to a second embodiment to which the present technology is applied.

FIGS. 6A, 6B, 6C, 6D, and 6E are cross-sectional views showing an example of a method of manufacturing a flexible gear according to a third embodiment to which the present technology is applied.

FIGS. 7A, 7B, 7C, 7D, 7E, 7F, 7G, 7H, 7I, and 7J are cross-sectional views showing an example of a method of manufacturing a flexible gear according to a fourth embodiment to which the present technology is applied.

MODE FOR CARRYING OUT THE INVENTION

Figure 1:
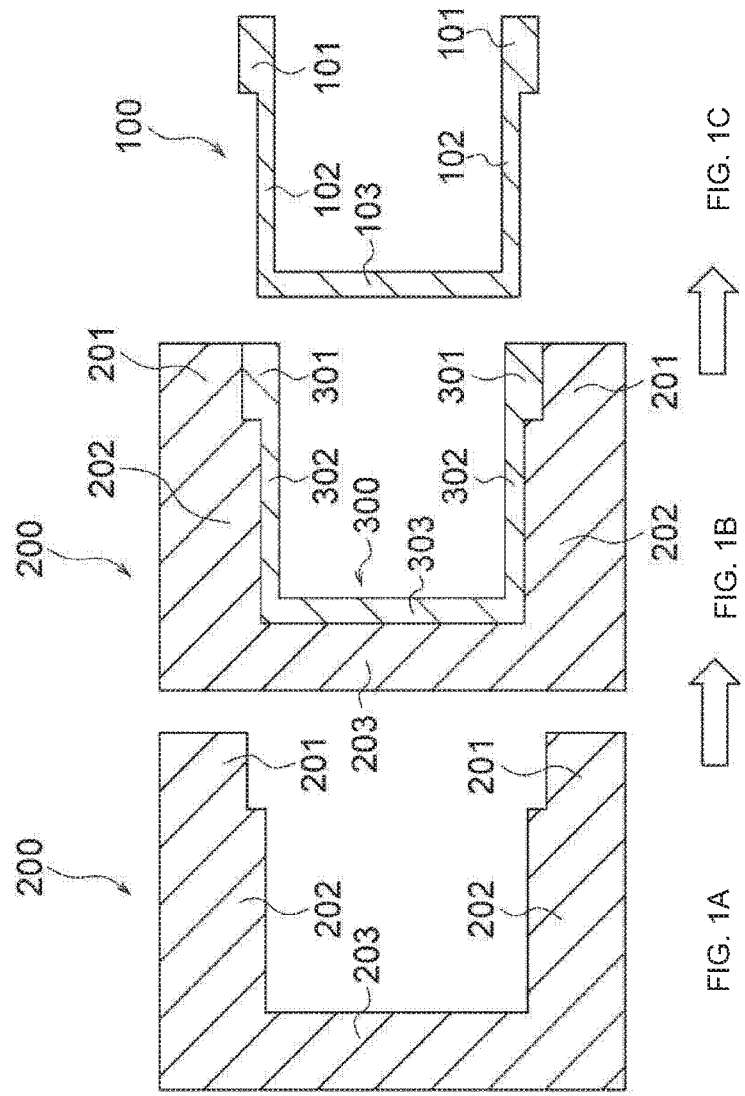
FIGS. 1A, 1B, and 1C are cross-sectional views showing an example of a method of manufacturing a flexible gear according to a first embodiment to which the present technology is applied.

Hereinafter, preferred embodiments for implementing the present technology will be described with reference to the drawings. The embodiments described below show an example of typical embodiments of the present technology. These do not narrow the interpretation of the scope of the present technology. Note that in the drawings, the same reference numerals are assigned to the same or equivalent elements or members without duplicated explanations.

Note that the description is made in the following order.
1. Overview of the present technology
2. First embodiment (Example 1 of method of manufacturing flexible gear)
3. Second embodiment (Example 2 of method of manufacturing flexible gear)
4. Third embodiment (Example 3 of method of manufacturing flexible gear)
5. Fourth Embodiment (Example 4 of method of manufacturing flexible gear)
6. Fifth Embodiment (Example 1 of method of manufacturing flexible gear unit)
7. Sixth Embodiment (Example 2 of method of manufacturing flexible gear unit)
8. Seventh embodiment (example of gear)
9. Eighth embodiment (example of flexible gear manufacturing apparatus)

1. Overview of the Present Technology

First, an overview of the present technology will be described.

The present technology relates to a method of manufacturing a flexible gear (flex spline) of harmonic drive gearing and a gear. In the manufacture of a flexible gear (flex spline) of a harmonic drive gear, for example, a diaphragm part, a body part, and a gear part are produced by molding or machining, individually, and joined together by electron beam welding or the like to produce a flexible gear. In this manufacturing method, steps of material cutting, molding, and joining need to be performed precisely in producing an individual flexible gear shape. Thus, many steps, time, and effort are required to obtain a single flexible gear, and may cost much.

Furthermore, in the case of cutting a thin-walled flexible gear from a piece of steel by cutting, most of an individual piece of steel becomes shavings, thus resulting in a low material utilization rate. It also takes machining time and blade cost, and may cost much. In view of this, there are manufacturing methods using tubular metal plastic forming and resin filling joining. However, the manufactured flexible gear may be unsuitable because it may be inferior in strength to a one-piece one including steel, and considering repeated deformation, a joint between different types of materials is repeatedly subjected to stress variation, so that there is a high probability that a defect such as separation will occur compared to that including materials having the same mechanical characteristics, and the life may be short.

Furthermore, in the manufacture of harmonic drive gearing, machining of steel is expensive. It can be manufactured by molding with a polymer material, but there are disadvantages, such as that there is a high probability that strength and durability as high as those of steel cannot be expected.

The present technology has been completed in view of circumstances as above. According to the present technology, flexible gears, which have had to be cut and welded individually, are produced by an electroforming method only by one step of production such as machining of a matrix, allowing a plurality of times of production. Thus, the manufacturing cost can be reduced. Further, very fine and faithful copying of the same shape can be repeated, thus allowing high quality to be maintained. Furthermore, as shown in FIGS. 4A, 4B, 4C, 4D, 4E, 4F, and 4G described later, a gear portion works to fill grooves with thickness, and thus can deliver performance comparable to that of steel both in mechanical characteristics and structural strength. Furthermore, according to the present technology, by producing a matrix through the replication of a model, a large number of matrices can be prepared at low cost. Consequently, a plurality of pieces can be electroformed at the same time, and electroforming time can be reduced by the amount corresponding to the number of pieces. Therefore, a further increase in the number of products and a further reduction in manufacturing cost can be expected. Furthermore, the faithful replication of the model allows shape quality to be maintained. Moreover, according to the present technology, if a matrix is produced by an electroforming MMS method, a plurality of matrices can be manufactured from a model, and further a plurality of flexible gears from each of the plurality of matrices only by an electroforming apparatus without using an injection molding machine. Thus, equipment cost can be reduced to reduce the manufacturing cost. Furthermore, it is also possible to produce a plurality of matrices with each flexible gear as a model, and manufacture flexible gears from each matrix. Consequently, productivity can be further improved to reduce the manufacturing cost. By joining a shaft or a hub to a flexible gear manufactured in this way, output can be easily obtained. By using insert injection molding, high-precision, high-strength flexible gears for harmonic drive speed reducers can be manufactured. These effects allow the productivity of harmonic drive speed reducers to be improved, the manufacturing cost to be reduced, and high quality to be stably obtained.

2. First Embodiment (Example 1 of Method of Manufacturing Flexible Gear)

A method of manufacturing a flexible gear according to a first embodiment (Example 1 of a method of manufacturing a flexible gear) of the present technology is a manufacturing method that includes preparing a matrix with a flexible gear shape, and forming, by an electroforming method using the matrix, a flexible gear shape with predetermined thickness and releasing the flexible gear shape from the matrix. Furthermore, the method of manufacturing the flexible gear according to the first embodiment (Example 1 of the method of manufacturing the flexible gear) of the present technology may be a manufacturing method that includes preparing a matrix with a flexible gear shape, and forming, by an electroforming method using the matrix, a flexible gear shape with predetermined thickness from a plating solution of a material suitable for the electroforming method, and releasing the flexible gear shape from the matrix.

The method of manufacturing the flexible gear according to the first embodiment of the present technology can achieve a further improvement in productivity and a further reduction in production cost.

Figure 3B:
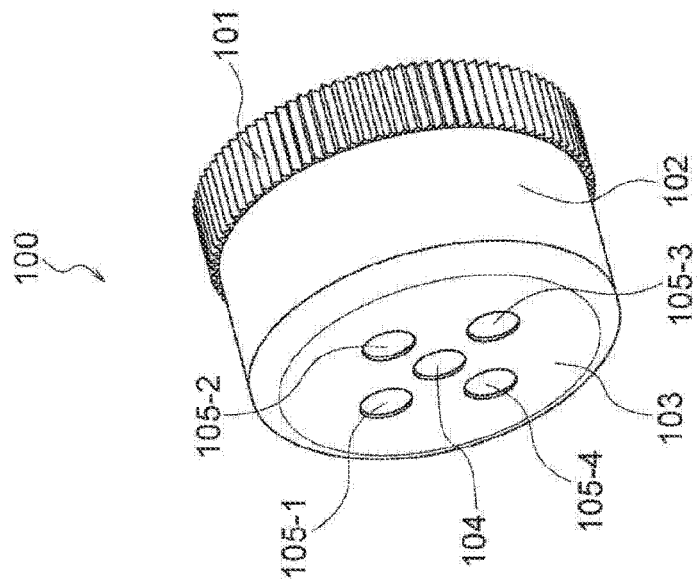
FIGS. 3A and 3B are perspective views showing a configuration example of a matrix and the flexible gear.
Figure 3A:
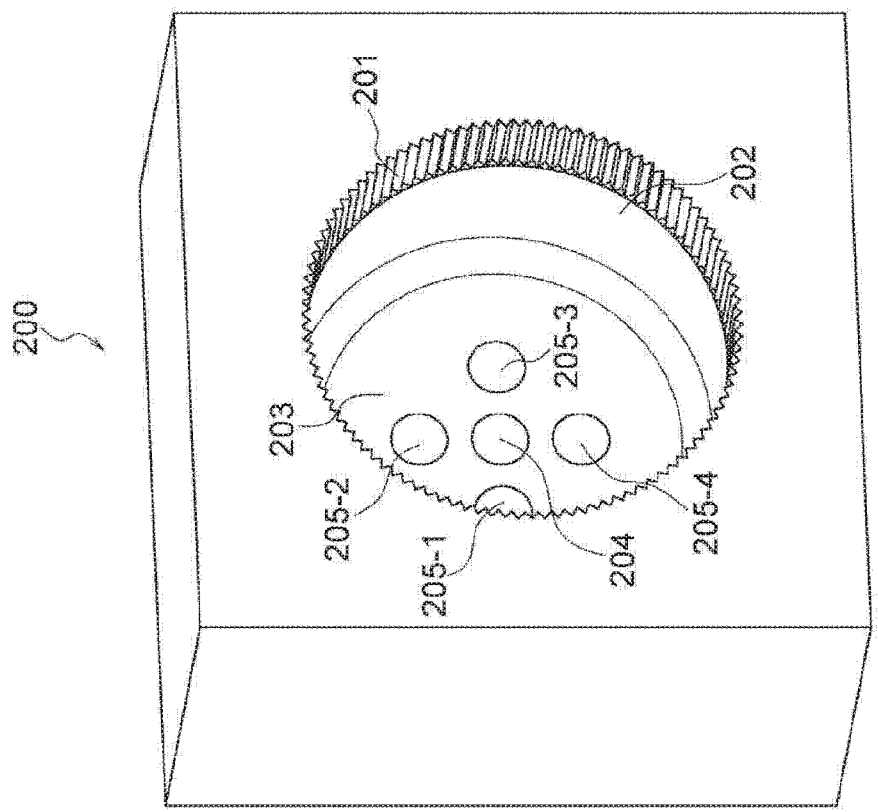

Hereinafter, with reference to FIGS. 1A, 1B, 1C, 2, 3A, 3B, 4A, 4B. 4C, 4D, 4E, 4F, and 4G, the method of manufacturing the flexible gear according to the first embodiment of the present technology will be described in detail. FIGS. 1A, 1B, and 1C are cross-sectional views showing an example of the method of manufacturing the flexible gear according to the first embodiment of the present technology. FIG. 2 is a table showing data of mechanical characteristics of an example of electroforming materials. FIGS. 3A and 3B are perspective views showing a configuration example of the matrix and the flexible gear. FIGS. 4A, 4B, 4C, 4D, 4E, 4F, and 4G are diagrams for explaining formation of a gear part (tooth portions) of the flexible gear by electroforming.

First, with reference to FIGS. 1A, 1B, and 1C, the method of manufacturing the flexible gear according to the first embodiment of the present technology will be described.

FIG. 1A is a cross-sectional view showing a matrix 200 with the shape of a flexible gear produced, for example, by machining. As shown in FIG. 1A, the matrix 200 includes a gear portion 201, a body portion 202, and a diaphragm portion 203 in a body. The matrix material of the matrix 200 is subjected to conductive treatment, masking treatment, and further release treatment if necessary. Then, a portion on which to form a deposit may be made a conductive surface, and a portion on which not to form a deposit a nonconductive surface.

FIG. 1B is a cross-sectional view showing a flexible gear shape 300 with predetermined thickness formed on the inside of the matrix 200 by depositing a material suitable for electroforming by electroforming using the matrix 200. As shown in FIG. 1B, a gear portion shape 301 of the flexible gear shape 300 is formed by deposition from the gear portion 201 of the matrix 200, a body portion shape 302 of the flexible gear shape 300 is formed by deposition from the body portion 202 of the matrix 200, and a diaphragm portion shape 303 of the flexible gear shape 300 is formed by deposition from the diaphragm portion 203 of the matrix 200.

FIG. 1C is a cross-sectional view showing a flexible gear 100 formed by releasing the flexible gear shape 300 from the matrix 200. As shown in FIG. 1C, the flexible gear 100 includes a gear part 101, a body part 102, and a diaphragm part 103 in a body. The gear part 101 has the gear portion shape 301, the body part 102 has the body portion shape 302, and the diaphragm part 103 has the diaphragm portion shape 303.

As plating metal for electroforming, copper and nickel are typically used. For producing ornaments, gold and silver are used. However, with recent advances in plating technology, various types of composite dispersal plating including Ni—Co alloys having superior performance, and the like have come into use. In electroforming, the most important thing is to use plating with the smallest possible internal stress. In general, a large internal stress exists in a plating layer. If electroforming is performed using this, the product is distorted and deformed, resulting in a significant decrease in precision. Therefore, a plating bath composition and plating conditions that prevent generation of internal stress may be selected. For this reason, in nickel plating, a sulfamate bath and saccharin or the like as an internal stress reduction portion are widely used.

Materials used for the matrix 200 include metals such as iron, stainless steel, copper and copper alloys, aluminum and aluminum alloys, zinc, and lead, and nonmetals such as epoxy resin, oils and fats, various plastics, plaster, glass, rubber, ceramic, and leather. These materials are used depending on the purpose. In the case of a metal, a release layer may be formed on the surface to facilitate release after plating. In the case of a nonmetal, a conductive layer (conductive coating) may be provided to impart conductivity. For the release layer, an oxide film or a compound film of the metal is used. For imparting conductivity, a silver mirror reaction method, an electroless plating method, a graphite or metal powder coating method, or the like is used. When the matrix 200 includes a nonmetallic material, a conductive layer and a release layer may be provided at the same time. In that case, the conductive layer and the release layer may be stacked in a desired order. That is, the order may be the conductive layer and the release layer from the surface of the matrix 200, or the order may be the release layer and the conductive layer from the surface of the matrix 200.

The material of the flexible gear shape 300 deposited may be an electroplatable material, or that multilayered to obtain strength, surface hardness, and wear resistance comparable to those of steel.

FIG. 2 shows an example of typical metallic materials and electroforming materials. Specifically, data of mechanical characteristics (hardness (HV), tensile strength (Mpa), elongation (%), Young's modulus (Gpa), a coefficient of linear thermal expansion ($\times 10^{-6}$/k), a heat transfer coefficient (W/(m·k)), and specific gravity) on an aluminum alloy, tool steel, and structural carbon steel as typical metallic materials, and nickel and nickel-cobalt as electroforming materials are shown. It is shown that the electroforming materials have mechanical characteristics comparable to those of the typical metallic materials.

FIGS. 3A and 3B show an example of the matrix 200 (FIG. 3A) and the flexible gear 100 (flexible external gear) (FIG. 3B) produced by electroforming. As shown in FIG. 3B, the flexible external gear 100 includes the diaphragm part 103, the body part 102, and the gear part 101 as external teeth that are continuously formed in this order in a body. The gear part 101 includes an annular member. The body part 102 includes a cylindrical member. The inner diameter of the annular member constituting the gear part 101 and the inner diameter of the cylindrical member constituting the body part 102 are substantially the same. The diaphragm part 103 includes a disk member. Note that FIG. 3B illustrates a case where a rigid gear has internal teeth and a flexible gear has external teeth. However, although not shown, a configuration in which a rigid gear has external teeth and a flexible gear has internal teeth is also viable. It is advisable to provide the diaphragm part 103 with unevenness such as holes or indentations to be able to hold torque when an output shaft or an output flange is joined thereto, because they enable transmission of torque greater than or equal to joint strength. In FIG. 3B, a structure is shown in which a central hole 104 maintains coaxial fitting between the diaphragm part 103 and an output shaft or an output flange, and four surrounding holes 105-1 to 105-4 (an uneven shape may be used) transmit rotary torque. As the shape of torque transmission, there are various ways such as a polygonal shape, a star shape, and a gear shape commonly used. The example of the four surrounding holes 105-1 to 105-4 shown in FIG. 3B is not intended to limit the shape.

As shown in FIGS. 3A and B, the gear part 101 of the flexible gear 100 is formed by depositing a material suitable for electroforming from the gear portion 201 of the matrix 200. The body part 102 of the flexible external gear 100 is formed by depositing the material suitable for electroforming from the body portion 202 of the matrix 200. The diaphragm part 103 of the flexible external gear 100 is formed by depositing the material suitable for electroforming from the body portion 203 of the matrix 200. The central hole 104 and the four surrounding holes 105-1 to 105-4 are formed, for example, by masking a central hole 204 and four surrounding holes 205-1 to 205-4 of the matrix 200. When portions corresponding to the central hole 104 and the four surrounding holes 105-1 to 105-4 are formed in a recessed shape, for example, the central hole 204 and the four surrounding holes 205-1 to 205-4 of the matrix 200 of the matrix 200 may be formed in a protruding shape.

FIGS. 4A, 4B, 4C, 4D, 4E, 4F, and 4G are partial cross-sectional views of a portion of the gear part 101 in FIGS. 3A and 3B, showing how the gear part 101 of the flexible gear 100 (corresponding to the teeth of the gear part 101) is formed by electroforming. FIG. 4A shows three teeth 201-1 to 201-3 of the gear portion 201 of the matrix 200. FIGS. 4B, 4C, 4D, 4E, 4F, and 4G show that with progress from a gear part 101b to a gear part 101g of the flexible gear 100, a recessed portion of the tooth 201-2 (the cross-sectional shape cut along the recessed direction is a substantially triangular shape) is gradually filled by deposition with uniform film thickness, and with the progress of a groove 106b to 106f, the size of the groove becomes smaller, and the groove disappears in FIG. 4G, resulting in the formation of the gear part 101. Furthermore, as shown in FIGS. 4B, 4C, 4D, 4E, 4F, and 4G, with progress from a groove portion 107b to a groove portion 107g corresponding to a valley between teeth of the gear 101, the film thickness of the groove portion 107 is gradually increased by deposition with uniform film thickness, forming an inner-diameter portion of the gear 101 continuous with the body part 102 having an inner diameter substantially the same as that of the body part 102.

That is, it is found that the flexible gear 100 formed by electroforming works to form uniform film thickness with respect to the matrix 200, so that, as shown in FIGS. 4B, 4C, 4D, 4E, and 4E, an acute-angled portion of the tooth 201-2 formed with uniform thickness becomes smaller as the acute-angled substantially-triangular-shaped groove 106b to 106f is filled with increase in thickness, and finally, as shown in FIG. 4G, the groove is filled. The groove 106 (106b to 106f) may not actually be filled due to the relationship between the height of the tooth 201-2 (also corresponding to 101b to 101g) and the thickness of the body 102b to 102g. In that case, a deposition thicker than intended can be formed to fill the groove, or nickel, for example, can be deposited with predetermined thickness, and then the groove can be further filled thick with an easy-to-cut, electroformable material such as copper, and finally can be made to have predetermined thickness by a method such as machining such as cutting, grinding, or polishing, or chemical or electrochemical treatment, or composite processing thereof (such as electrolytic polishing or electrolytic grinding).

Harmonic drive speed reducers are often designed for the purpose of obtaining a large reduction ratio, and thus tend to have a large number of teeth and a small tooth height. Thus, it may often be the case that at the point of time when a required body thickness is reached, the groove 106 (106b to 106f) at the tooth root is filled as described above. Alternatively, if grooves are of a small size, they may not significantly affect torque transmission performance and life. In that case, using them as they are with unchanged predetermined thickness can avoid additional cost without increasing process and process time.

3. Second Embodiment (Example 2 of Method of Manufacturing Flexible Gear)

A method of manufacturing a flexible gear according to a second embodiment (Example 2 of a method of manufacturing a flexible gear) of the present technology is a manufacturing method that includes preparing a matrix with a flexible gear shape, and forming, by an electroforming method using the matrix, a flexible gear shape with predetermined thickness and releasing the flexible gear shape from the matrix, in which the preparation of the matrix with the flexible gear shape is replication of a model, and the replication uses an injection molding method. Furthermore, the method of manufacturing the flexible gear according to the second embodiment (Example 2 of the method of manufacturing the flexible gear) of the present technology may be a manufacturing method that includes preparing a matrix with a flexible gear shape, and forming, by an electroforming method using the matrix, a flexible gear shape with predetermined thickness from a plating solution of a material suitable for the electroforming method, and releasing the flexible gear shape from the matrix, in which the preparation of the matrix with the flexible gear shape is replication of a model, and the replication uses an injection molding method.

The method of manufacturing the flexible gear according to the second embodiment of the present technology, in which the matrix is produced by replication of the model using the injection molding method, allows the matrix to be easily prepared, and the flexible gear to be formed by subjecting the matrix to electroforming, depositing the material suitable for electroforming into the flexible gear shape with predetermined thickness, and releasing this from the matrix. By performing electroforming once on a plurality of produced matrices aligned at the same time, a plurality of flexible gears that are electroformed products can be produced at the same time. This means that the time of an electroforming process is shortened by the amount corresponding to the number, compared to the case of performing electroforming on one piece at one time, and the amount of production can be increased. For example, the time required to electroform a stamper with a thickness of 300 μm from an optical disc master is about one hour. Thus, the time required to form a flexible gear with a thickness of 100 μm by deposition is considered to be about twenty minutes. By producing twenty matrices from a model and forming twenty flexible gears through deposition at the same time, one piece can be produced in one minute, dramatically improving productivity compared to conventional methods.

Hereinafter, with reference to FIGS. 5A, 5B, 5C, 5D, and 5E, the method of manufacturing the flexible gear according to the second embodiment of the present technology will be described in detail. FIGS. 5A, 5B, 50, 5D, and 5E are cross-sectional views showing an example of the method of manufacturing the flexible gear according to the second embodiment to which the present technology is applied.

FIG. 5A is a cross-sectional view showing a model (mold) 400 produced, for example, by machining. As shown in FIG. 5A, the model 400 is formed with a cavity 404 for injecting resin or the like by injection molding. The cavity 404 includes a portion 401 corresponding to a gear, a portion 402 corresponding to a body, and a portion 403 corresponding to a diaphragm.

FIG. 5B is a cross-sectional view showing a matrix 500 with a flexible gear shape formed by injection molding using the model 400. As shown in FIG. 5B, a gear portion shape 501 of the matrix 500 with the flexible gear shape is formed by injection molding from the portion 401 of the model 400 corresponding to the gear, a body portion shape 502 of the matrix 500 with the flexible gear shape is formed by injection molding from the portion 402 of the model 400 corresponding to the body, and a diaphragm portion shape 503 of the matrix 500 with the flexible gear shape is formed by injection molding from the portion 403 of the model 400 corresponding to the diaphragm.

The formation of the matrix 500 with the flexible gear shape from the model 400 may be injection molding using a material that can be injection-molded, such as resin, metal, metallic glass, ceramic, or conductive ceranix. Injection molding is characterized by being able to faithfully and precisely copy the shape of the mold that is the model 400 in a short time, and is widely used for general industrial products. It is characterized by extremely high quality reliability and productivity. Once set, it facilitates automatic production, and thus can be implemented at low cost. For injection molding, thermoplastic resin is widely and commonly used. Alternatively, ceramic or metal can be impalpably powdered and kneaded with a binder (resin, wax, or the like) into pellets with good formability, injection-molded by an injection molding machine similar to that for resin molding, degreased (subjected to heating treatment or solvent treatment with an organic solvent, water, or the like) to remove the binder, and sintered in a sintering furnace, thereby forming a matrix. If the matrix 500 is a metal matrix, it is a conductor and thus only requires masking treatment. If it is of ceramic, it is usually a nonconductor, and thus may require conductive treatment and masking treatment. Compared to resin, metal and ceramic are excellent in surface hardness, mechanical strength, and heat resistance, and thus allow the matrix to be used more repeatedly. Thus, in a case where the production quantity is large, the matrix of metal or ceramic can resultantly reduce the matrix production cost more. Furthermore, a low-melting-point metallic glass material allows injection molding without using a binder, and thus can be expected to have molding precision similar to that of resin, and can lengthen the matrix life.

FIG. 5C is a cross-sectional view showing a matrix 200 formed by releasing the matrix 500 with the flexible gear shape from the model 400. As shown in FIG. 5C, the matrix 200 includes a gear portion 201, a body portion 202, and a diaphragm portion 203 in a body.

FIG. 5D is a cross-sectional view showing a flexible gear shape 300 with predetermined thickness formed on the inside of the matrix 200 by depositing a material suitable for electroforming by electroforming using the matrix 200. As shown in FIG. 5D, a gear portion shape 301 of the flexible gear shape 300 is formed by deposition from the gear portion 201 of the matrix 200, a body portion shape 302 of the flexible gear shape 300 is formed by deposition from the body portion 202 of the matrix 200, and a diaphragm portion shape 303 of the flexible gear shape 300 is formed by deposition from the diaphragm portion 203 of the matrix 200.

FIG. 5E is a cross-sectional view showing a flexible gear 100 formed by releasing the flexible gear shape 300 from the matrix 200. As shown in FIG. 5E, the flexible gear 100 includes a gear part 101, a body part 102, and a diaphragm part 103 in a body. The gear part 101 has the gear portion shape 301, the body part 102 has the body portion shape 302, and the diaphragm part 103 has the diaphragm portion shape 303.

4. Third Embodiment (Example 3 of Method of Manufacturing Flexible Gear)

A method of manufacturing a flexible gear according to a third embodiment (Example 3 of a method of manufacturing a flexible gear) of the present technology is a manufacturing method that includes preparing a matrix with a flexible gear shape, and forming, by an electroforming method using the matrix, a flexible gear shape with predetermined thickness and releasing the flexible gear shape from the matrix, in which the preparation of the matrix with the flexible gear shape is replication of a model, and the replication uses an electroforming method. Furthermore, the method of manufacturing the flexible gear according to the third embodiment (Example 3 of the method of manufacturing the flexible gear) of the present technology may be a manufacturing method that includes preparing a matrix with a flexible gear shape, and forming, by an electroforming method using the matrix, a flexible gear shape with predetermined thickness from a plating solution of a material suitable for the electroforming method, and releasing the flexible gear shape from the matrix, in which the preparation of the matrix with the flexible gear shape is replication of a model, and the replication uses an electroforming method.

The method of manufacturing the flexible gear according to the third embodiment of the present technology, in which the matrix is produced by replication of a model using the electroforming method, allows the matrix to be easily prepared, and the flexible gear to be formed by subjecting the matrix to electroforming, depositing the material suitable for electroforming into the flexible gear shape with predetermined thickness, and releasing this from the matrix. By performing electroforming once on a plurality of produced matrices aligned at the same time, a plurality of flexible gears that are electroformed products can be produced at the same time. This means that the time of an electroforming process is shortened by the amount corresponding to the number, compared to the case of performing electroforming on one piece at one time, and the amount of production can be increased. For example, a flexible gear with a thickness of 100 μm can be formed in about twenty minutes. By producing twenty matrices from a model and forming twenty flexible gears through deposition at the same time, one piece can be produced in one minute, dramatically improving productivity compared to conventional methods.

The method of manufacturing the flexible gear according to the third embodiment of the present technology is a method applicable to the production of stampers for music records and optical discs. A metal master is formed by electroforming from a resin master. From this metal master, a plurality of mother stampers can be produced by electroforming. From each mother stamper, a plurality of stampers can be further formed by electroforming. With the stampers, a large number of music records or optical discs can be produced by injection molding. In the release process of removing one metal master from one resin master, or the like, a fine pattern on a brittle resin master easily deteriorates. However, a metal master is excellent in both hardness and strength, and thus allows a plurality of mother stampers to be produced. Each mother stamper allows production of a plurality of stampers. Thus, music or data engraved on one resin master can be simultaneously replicated in large quantities as records and optical discs by a plurality of injection molding machines.

Hereinafter, with reference to FIGS. 6A, 6B, 6C, 6D, and 6E, the method of manufacturing the flexible gear according to the third embodiment of the present technology will be described in detail. FIGS. 6A, 6B, 6C, 6D, and 6E are cross-sectional views showing an example of the method of manufacturing the flexible gear according to the third embodiment of the present technology.

FIG. 6A is a cross-sectional view showing a model (mold) 600 produced, for example, by machining. As shown in FIG. 6A, the model 600 includes a portion 601 corresponding to a gear, a portion 602 corresponding to a body, and a portion 603 corresponding to a diaphragm.

FIG. 6B is a cross-sectional view showing a matrix 700 with a flexible gear shape with predetermined thickness formed on the outside of the model 600 by depositing a material suitable for electroforming by electroforming using the model 600. As shown in FIG. 6B, a gear portion shape 701 of the matrix 700 with the flexible gear shape is formed by deposition from the portion 601 of the model 600 corresponding to the gear, a body portion shape 702 of the matrix 700 with the flexible gear shape is formed by deposition from the portion 602 of the model 600 corresponding to the body, and a diaphragm portion shape 703 of the matrix 700 with the flexible gear shape is formed by deposition from the portion 603 of the model 600 corresponding to the diaphragm.

To form the matrix 700 by electroforming, the model 600 is subjected to conductive treatment and masking treatment so that the matrix 700 is formed by electroforming.

FIG. 6C is a cross-sectional view showing a matrix 800 formed by releasing the matrix 700 with the flexible gear shape from the model 600. As shown in FIG. 6C, the matrix 800 includes a gear portion 801, a body portion 802, and a diaphragm portion 803 in a body. Note that what has been described on the matrix 200 can be applied to the matrix 800 without changes except for what has been described in the section of the third embodiment.

FIG. 6D is a cross-sectional view showing a flexible gear shape 300 with predetermined thickness formed on the inside of the matrix 800 (electroformed matrix) by subjecting the matrix 800 to masking treatment or the like, and depositing a material suitable for electroforming by electroforming using the matrix 800. As shown in FIG. 6D, a gear portion shape 301 of the flexible gear shape 300 is formed by deposition from the gear portion 801 of the matrix 800, a body portion shape 302 of the flexible gear shape 300 is formed by deposition from the body portion 802 of the matrix 800, and a diaphragm portion shape 303 of the flexible gear shape 300 is formed by deposition from the diaphragm portion 803 of the matrix 800. Note that, although not shown in the present embodiment, an oxide film of about several nm, for example, may be formed as a release layer on the surface of the matrix 800 before the flexible gear shape 300 is formed by electroforming.

FIG. 6E is a cross-sectional view showing a flexible gear 100 formed by releasing the flexible gear shape 300 from the matrix 800. As shown in FIG. 6E, the flexible gear 100 includes a gear part 101, a body part 102, and a diaphragm part 103 in a body. The gear part 101 has the gear portion shape 301, the body part 102 has the body portion shape 302, and the diaphragm part 103 has the diaphragm portion shape 303.

5. Fourth Embodiment (Example 4 of Method of Manufacturing Flexible Gear)

A method of manufacturing a flexible gear according to a fourth embodiment (Example 4 of a method of manufacturing a flexible gear) of the present technology is a manufacturing method that includes preparing a matrix with a flexible gear shape, and forming, by an electroforming method using the matrix, a flexible gear shape with predetermined thickness and releasing the flexible gear shape from the matrix, in which the preparation of the matrix with the flexible gear shape is replication of a model and a flexible gear as a model, and the replication uses an electroforming method. Furthermore, the method of manufacturing the flexible gear according to the fourth embodiment (Example 4 of the method of manufacturing the flexible gear) of the present technology may be a manufacturing method that includes preparing a matrix with a flexible gear shape, and forming, by an electroforming method using the matrix, a flexible gear shape with predetermined thickness from a plating solution of a material suitable for the electroforming method, and releasing the flexible gear shape from the matrix, in which the preparation of the matrix with the flexible gear shape is replication of a model and a flexible gear as a model, and the replication uses an electroforming method.

The method of manufacturing the flexible gear according to the fourth embodiment of the present technology, in which the matrix is produced by replication of the model and the flexible gear as the model using the electroforming method, allows the matrix to be easily prepared, and the flexible gear to be formed by subjecting the matrix to electroforming, depositing the material suitable for electroforming into the flexible gear shape with predetermined thickness, and releasing this from the matrix. By performing electroforming once on a plurality of produced matrices aligned at the same time, a plurality of flexible gears that are electroformed products can be produced at the same time. This means that the time of an electroforming process is shortened by the amount corresponding to the number, compared to the case of performing electroforming on one piece at one time, and the amount of production can be increased. For example, a flexible gear with a thickness of 100 μm can be formed in about twenty minutes. By producing twenty matrices from a model and forming twenty flexible gears through deposition at the same time, one piece can be produced in one minute, dramatically improving productivity compared to conventional methods.

Furthermore, according to the method of manufacturing the flexible gear in the fourth embodiment of the present technology, a plurality of matrices is produced from a model, and a plurality of flexible gears can be produced from each matrix, and a matrix is produced with each flexible gear as a model and further a plurality of flexible gears can be produced from each matrix. Thus, a large number of flexible gears with the same shape can be produced without damaging the gear shape and the like precisely finished by machining.

Hereinafter, with reference to FIGS. 7A, 7B, 7C, 7D, 7E, 7F, 7G, 7H, 7I, and 7J, the method of manufacturing the flexible gear according to the fourth embodiment of the present technology will be described in detail. FIGS. 7A, 7B, 7C, 7D. 7E, 7F, 7G, 7H, 7I, and 7J are cross-sectional views showing an example of the method of manufacturing the flexible gear according to the fourth embodiment of the present technology.

FIG. 7A is a cross-sectional view showing a model (mold) 600 produced, for example, by machining. As shown in FIG. 7A, the model 600 includes a portion 601 corresponding to a gear, a portion 602 corresponding to a body, and a portion 603 corresponding to a diaphragm.

FIG. 7B is a cross-sectional view showing a matrix 700 with a flexible gear shape with predetermined thickness formed on the outside of the model 600 by depositing a material suitable for electroforming by electroforming using the model 600. As shown in FIG. 7B, a gear portion shape 701 of the matrix 700 with the flexible gear shape is formed by deposition from the portion 601 of the model 600 corresponding to the gear, a body portion shape 702 of the matrix 700 with the flexible gear shape is formed by deposition from the portion 602 of the model 600 corresponding to the body, and a diaphragm portion shape 703 of the matrix 700 with the flexible gear shape is formed by deposition from the portion 603 of the model 600 corresponding to the diaphragm.

To form the matrix 700 by electroforming, the model 600 is subjected to conductive treatment and masking treatment so that the matrix 700 is formed by electroforming.

FIG. 7C is a cross-sectional view showing a matrix 800 formed by releasing the matrix 700 with the flexible gear shape from the model 600. As shown in FIG. 7C, the matrix 800 includes a gear portion 801, a body portion 802, and a diaphragm portion 803 in a body.

FIG. 7D is a cross-sectional view showing a flexible gear shape 900 with predetermined thickness formed on the inside of the matrix 800 (electroformed matrix) by subjecting the matrix 800 to masking treatment or the like, and depositing a material suitable for electroforming by electroforming using the matrix 800. As shown in FIG. 7D, a gear portion shape 901 of the flexible gear shape 900 is formed by deposition from the gear portion 801 of the matrix 800, a body portion shape 902 of the flexible gear shape 900 is formed by deposition from the body portion 802 of the matrix 800, and a diaphragm portion shape 903 of the flexible gear shape 900 is formed by deposition from the diaphragm portion 803 of the matrix 800. Note that, although not shown, an oxide film of about several nm, for example, may be formed as a release layer on the surface of the matrix 800 before the flexible gear shape 900 is formed by electroforming.

FIG. 7E is a cross-sectional view showing a flexible gear 100 formed by releasing the flexible gear shape 900 from the matrix 800. As shown in FIG. 7E, the flexible gear 100 includes a gear part 101, a body part 102, and a diaphragm part 103 in a body. The gear part 101 has the gear portion shape 901, the body part 102 has the body portion shape 902, and the diaphragm part 103 has the diaphragm portion shape 903.

FIG. 7E is a cross-sectional view showing the flexible gear 100 prepared as a model.

FIG. 7G is a cross-sectional view showing a matrix 1000 with a flexible gear shape with predetermined thickness formed on the outside of the flexible gear 100 by depositing a material suitable for electroforming by electroforming using the flexible gear 100 as the model. As shown in FIG. 7G, a gear portion shape 1001 of the matrix 1000 with the flexible gear shape is formed by deposition from the gear part 101 of the flexible gear 100, a body portion shape 1002 of the matrix 1000 with the flexible gear shape is formed by deposition from the body part 102 of the flexible gear 100, and a diaphragm portion shape 1003 of the matrix 1000 with the flexible gear shape is formed by deposition from the diaphragm part 103 of the flexible gear 100.

To form the matrix 1000 by electroforming, the flexible gear 100 is subjected to conductive treatment and masking treatment so that a matrix 1100 is formed by electroforming.

FIG. 7H is a cross-sectional view showing the matrix 1100 formed by releasing the matrix 1000 with the flexible gear shape from the flexible gear 100 as the model. As shown in FIG. 7H, the matrix 1100 includes a gear portion 1101, a body portion 1102, and a diaphragm portion 1103 in a body. Note that what has been described on the matrix 200 can be applied to the matrix 1100 without changes except for what has been described in the section of the fourth embodiment.

FIG. 7I is a cross-sectional view showing a flexible gear shape 1200 with predetermined thickness formed on the inside of the matrix 1100 (electroformed matrix) by subjecting the matrix 1100 to masking treatment or the like, and depositing a material suitable for electroforming by electroforming using the matrix 1100. As shown in FIG. 7I, a gear portion shape 1201 of the flexible gear shape 1200 is formed by deposition from the gear portion 1101 of the matrix 1100, a body portion shape 1202 of the flexible gear shape 1200 is formed by deposition from the body portion 1102 of the matrix 1100, and a diaphragm portion shape 1203 of the flexible gear shape 1200 is formed by deposition from the diaphragm portion 1103 of the matrix 1100.

FIG. 7J is a cross-sectional view showing a flexible gear 100 formed by releasing the flexible gear shape 1200 from the matrix 1100. As shown in FIG. 7J, the flexible gear 100 includes a gear part 101, a body part 102, and a diaphragm part 103 in a body. The gear part 101 has the gear portion shape 1201, the body part 102 has the body portion shape 1202, and the diaphragm part 103 has the diaphragm portion shape 1203.

6. Fifth Embodiment (Example 1 of Method of Manufacturing Flexible Gear Unit)

A method of manufacturing a flexible gear unit according to a fifth embodiment (Example 1 of a method of manufacturing a flexible gear unit) of the present technology includes the method of manufacturing the flexible gear according to any one of the first to fourth embodiments of the present technology, and joining a shaft and/or a hub to the flexible gear.

As described above, a flexible gear produced by electroforming deposition is produced so as to be formed with uniform thickness, and thus may be unsuitable for being simultaneously formed with a shaft or a hub for taking output torque or rotation. Thus, a shaft or a hub may need to be provided separately in combination, and therefore a shaft or a hub is joined to the flexible gear to take output. For a joining method, from different types of methods such as bonding with an adhesive, fusion, welding, and diffusion joining of electroformed metal and metal or resin, ceramic, or the like, a method may be selected which provides joining strength greater than or equal to the maximum allowable torque of a harmonic drive gear and has a 1 or higher safety factor.

Figure 8A:
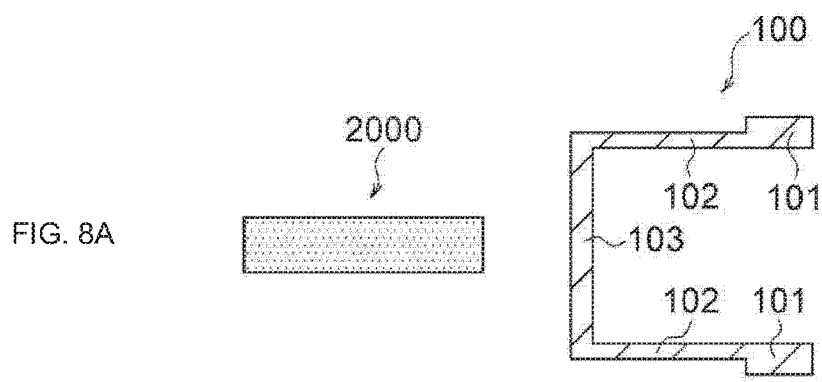
FIGS. 8A and 8B are cross-sectional views showing an example of a method of manufacturing a flexible gear unit according to a fifth embodiment to which the present technology is applied.
Figure 8B:
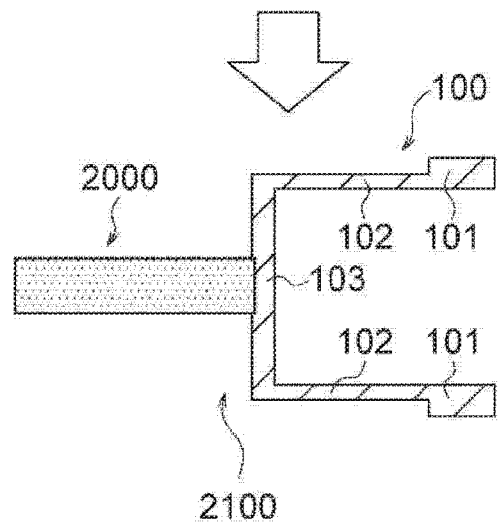
Figure 9A:
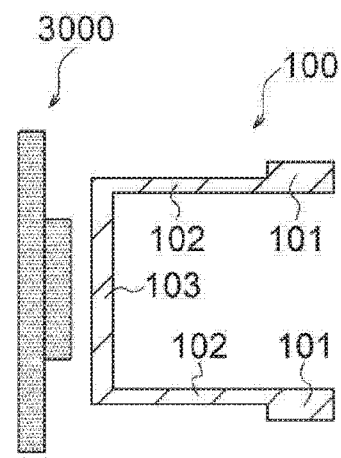
FIGS. 9A and 9B are cross-sectional views showing an example of the method of manufacturing the flexible gear unit according to the fifth embodiment to which the present technology is applied.
Figure 9B:
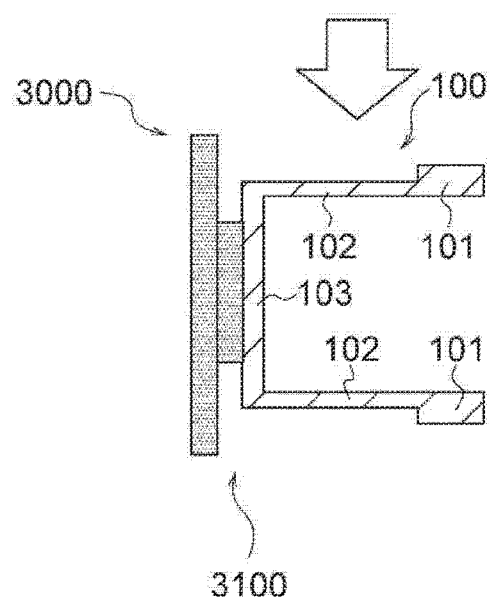

Hereinafter, with reference to FIGS. 8A, 8B, 9A, and 9B, the method of manufacturing the flexible gear unit according to the fifth embodiment of the present technology will be described in detail. FIGS. 8A and 8B are examples of the method of manufacturing the flexible gear unit according to the fifth embodiment of the present technology, and is a cross-sectional view showing a shaft joined to the flexible gear produced by the method of manufacturing the flexible gear according to any one of the first to fourth embodiments of the present technology. FIGS. 9A and 9B are examples of the method of manufacturing the flexible gear unit according to the fifth embodiment of the present technology, and is a cross-sectional view showing a hub joined to the flexible gear produced by the method of manufacturing the flexible gear according to any one of the first to fourth embodiments of the present technology.

First, with reference to FIGS. 8A and 8B, the method of manufacturing the flexible gear unit according to the fifth embodiment of the present technology will be described.

FIG. 8A is a cross-sectional view showing the preparation of the flexible gear 100 produced by the method of manufacturing the flexible gear according to any one of the first to fourth embodiments of the present technology, and a shaft 2000. As shown in FIG. 8A, the flexible gear 100 includes the gear part 101, the body part 102, and the diaphragm part 103 in a body.

FIG. 8B is a cross-sectional view showing the diaphragm part 103 of the flexible gear 100 and a vertical surface (in the vertical direction of FIG. 8B) of the shaft 2000 joined together. As shown in FIG. 8B, the flexible gear 100 and the shaft 2000 are joined face-to-face to produce a flexible gear unit. Furthermore, as described in FIG. 8A, the flexible gear 100 includes the gear part 101, the body part 102, and the diaphragm part 103 in a body also in FIG. 8B. Note that, although presented schematically in the figure, the end of the shaft 2000 may be formed in an appropriately branched shape so as to be fitted into recessed portions 105-1 to 105-4 provided in the flexible gear 100 in a case where high torque is required.

FIG. 9A is a cross-sectional view showing the preparation of the flexible gear 100 produced by the method of manufacturing the flexible gear according to any one of the first to fourth embodiments of the present technology, and a hub 3000. As shown in FIG. 9A, the flexible gear 100 includes the gear part 101, the body part 102, and the diaphragm part 103 in a body.

FIG. 9B is a cross-sectional view showing the diaphragm part 103 of the flexible gear 100 and a vertical surface (in the vertical direction of FIG. 9B) of the smaller one of two members constituting the hub 3000 are joined together. As shown in FIG. 9B, the flexible gear 100 and the hub 3000 joined face-to-face to produce a flexible gear unit. Furthermore, as described in FIG. 9A, the flexible gear 100 includes the gear part 101, the body part 102, and the diaphragm part 103 in a body also in FIG. 9B.

As described above, FIGS. 8A, 8B, 9A, and 9B show the face-to-face joining. Alternatively, a cylindrical portion may be formed on the diaphragm part 103 to join the cylinder to the shaft or to a cylinder, a surface, or the like constituting the hub. Alternatively, a prism may be formed on the diaphragm part 103 to join the prism to the shaft or to a prism, a cylinder, a surface, or the like constituting the hub. Many variations in joining are not excluded.

7. Sixth Embodiment (Example 2 of Method of Manufacturing Flexible Gear Unit)

A method of manufacturing a flexible gear unit according to a sixth embodiment (Example 2 of a method of manufacturing a flexible gear unit) of the present technology includes the method of manufacturing the flexible gear according to any one of the first to fourth embodiments of the present technology, and joining a shaft and/or a hub to the flexible gear, in which the joining uses an insert injection molding method.

Specifically, the method of manufacturing the flexible gear unit according to the sixth embodiment of the present technology is a manufacturing method using insert injection molding in which a flexible gear is inserted, and injection molding is performed with resin, metal, metallic glass, ceramic, or the like, using a mold with a shaft or hub shape, to integrate the flexible gear and the shaft or the flexible gear and the hub.

According to the method of manufacturing the flexible gear unit according to the sixth embodiment of the present technology, the shape of the molded shaft or hub can be complicated or incorporated so as not to come off, so that a stronger joint strength can be obtained. Furthermore, by setting in a mold, the concentricity of the gear part and the shaft or hub can be easily maintained with high precision. Furthermore, production by automatic operation using a mounting and removing hand or robot is also possible, so that the effect of reducing labor costs in manufacturing cost can be expected.

Figure 10:
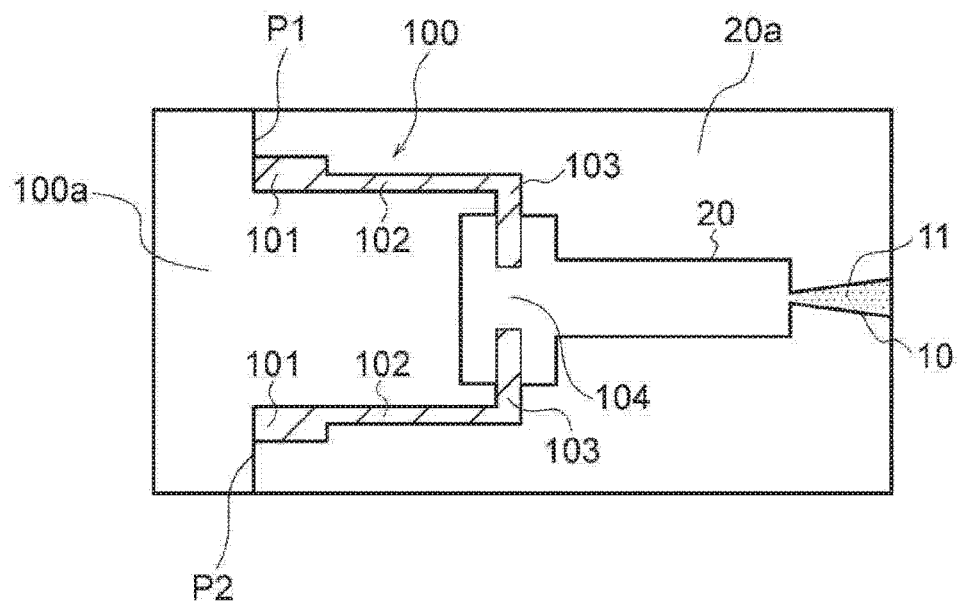
FIG. 10 is a cross-sectional view showing part of an example of a method of manufacturing a flexible gear unit according to a sixth embodiment to which the present technology is applied.
Figure 11:
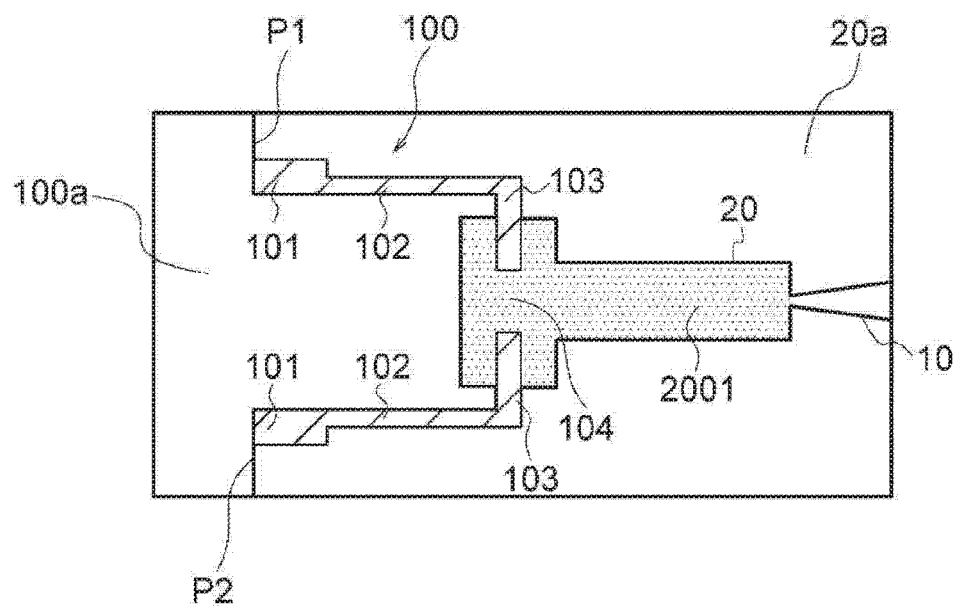
FIG. 11 is a cross-sectional view showing part of the example of the method of manufacturing the flexible gear unit according to the sixth embodiment to which the present technology is applied.
Figure 12:
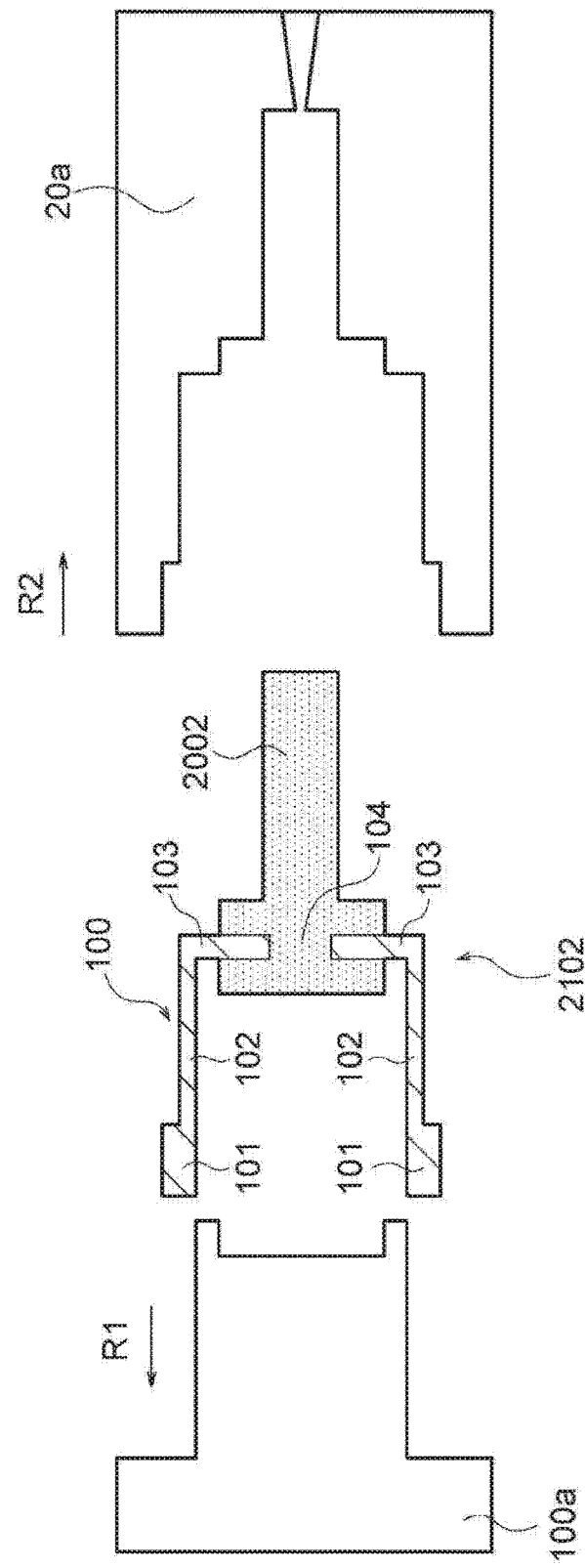
FIG. 12 is a cross-sectional view showing part of the example of the method of manufacturing the flexible gear unit according to the sixth embodiment to which the present technology is applied.
Figure 13:
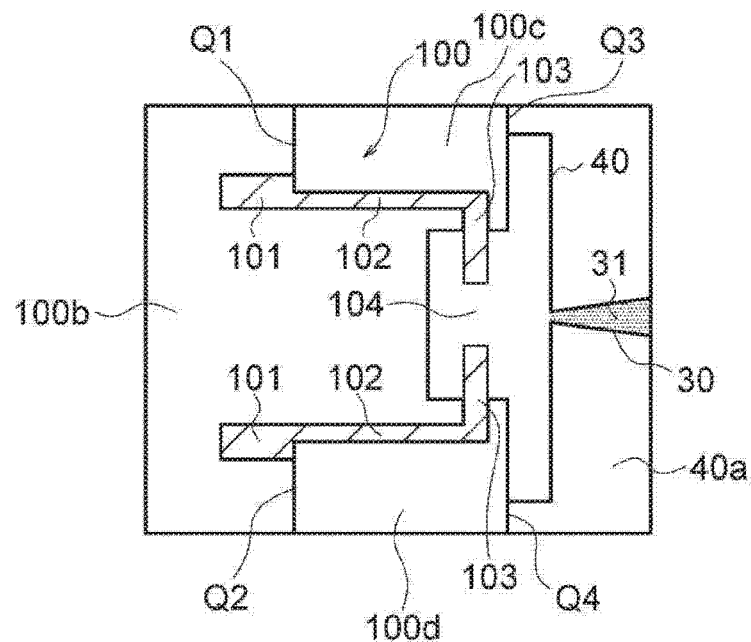
FIG. 13 is a cross-sectional view showing part of an example of the method of manufacturing the flexible gear unit according to the sixth embodiment to which the present technology is applied.
Figure 14:
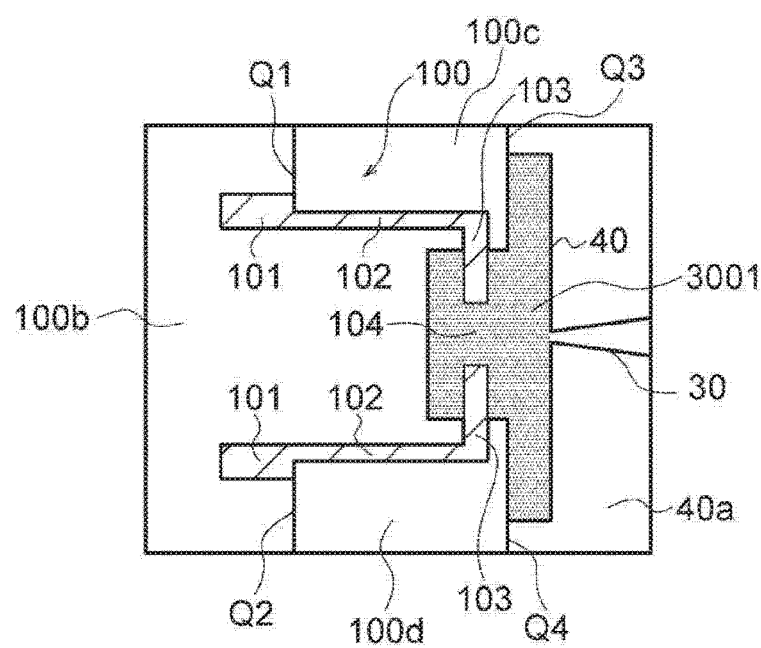
FIG. 14 is a cross-sectional view showing part of the example of the method of manufacturing the flexible gear unit according to the sixth embodiment to which the present technology is applied.
Figure 15:
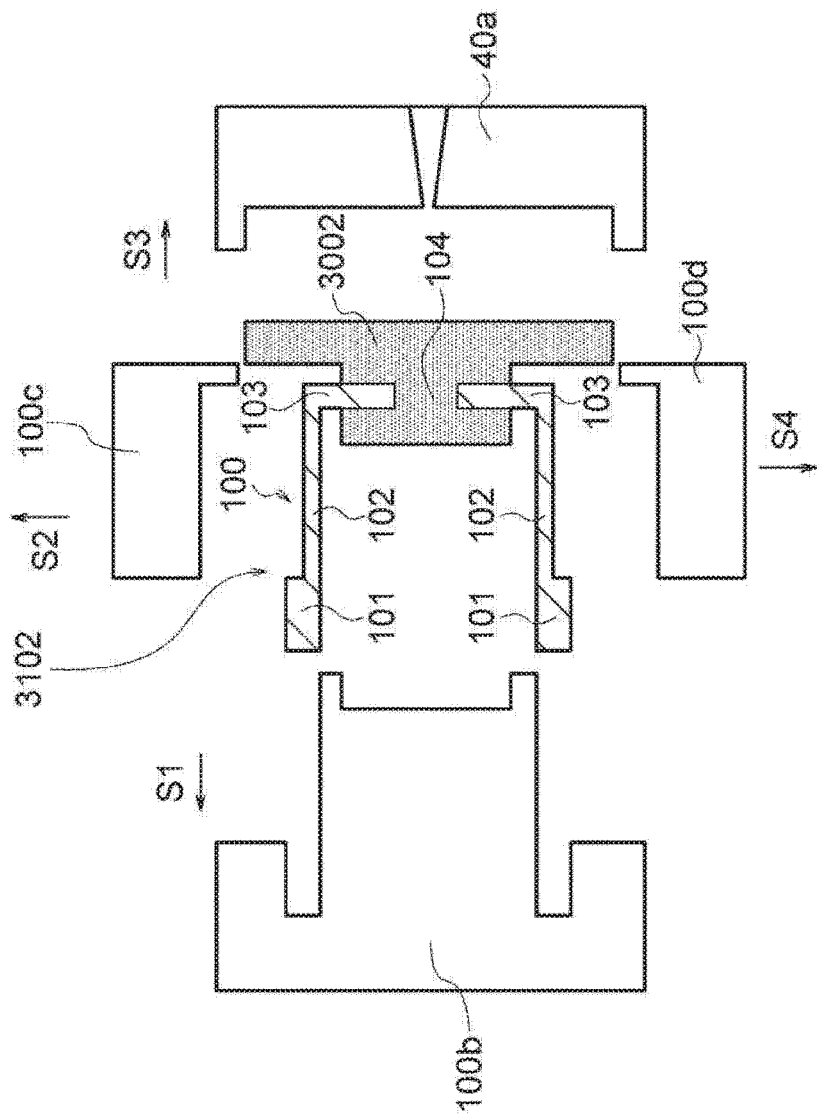
FIG. 15 is a cross-sectional view showing part of the example of the method of manufacturing the flexible gear unit according to the sixth embodiment to which the present technology is applied.

Hereinafter, with reference to FIGS. 10 to 12 and FIGS. 13 to 15, the method of manufacturing the flexible gear unit according to the fifth embodiment of the present technology will be described in detail. FIGS. 10 to 12 are an example of the method of manufacturing the flexible gear unit according to the sixth embodiment of the present technology, and is a cross-sectional view showing a shaft joined to the flexible gear produced by the method of manufacturing the flexible gear according to any one of the first to fourth embodiments of the present technology, using an insert injection molding method. FIGS. 13 to 15 are an example of the method of manufacturing the flexible gear unit according to the sixth embodiment of the present technology, and is a cross-sectional view showing a hub joined to the flexible gear produced by the method of manufacturing the flexible gear according to any one of the first to fourth embodiments of the present technology, using an insert injection molding method.

First, with reference to FIGS. 10 to 12, the method of manufacturing the flexible gear unit according to the sixth embodiment of the present technology will be described.

FIG. 10 is a cross-sectional view showing the arrangement of the flexible gear 100 produced by the method of manufacturing the flexible gear according to any one of the first to fourth embodiments of the present technology, a mold core part 100a, and a mold cavity part 20a. A mold interior 20 for the shaft includes the mold core part 100a and the mold cavity part 20a. The mold core part 100a and the mold cavity part 20a are joined together along parting lines P1 and P2. The shaft is molded in conformance with the shape of the mold interior 20 for the shaft. As shown in FIG. 10, the flexible gear 100 includes the gear part 101, the body part 102, and the diaphragm part 103 in a body. Furthermore, the central hole 104 formed in the diaphragm part 103 is disposed in the mold interior 20. An injection part 10 filled with resin or the like 11 is connected to a rightmost portion of the mold interior 20 in FIG. 10.

FIG. 11 is a cross-sectional view showing that the resin or the like 11 has been injected from the injection part 10 into the mold interior 20. In FIG. 11, the mold core part 100a and the mold cavity part 20a remain joined together along the parting lines P1 and P2, and are not open, and the shaft 2001 is molded in the mold interior 20. Furthermore, as described in FIG. 10, the flexible gear 100 includes the gear part 101, the body part 102, and the diaphragm part 103 in a body also in FIG. 11.

FIG. 12 is a cross-sectional view showing that the mold core part 100a and the mold cavity part 20a have opened, and a flexible gear unit 2102 including the flexible gear 100 and the shaft 2002 has been produced. As shown in FIG. 12, starting from the parting lines P1 and P2 (not shown), the mold core part 100a opens in an arrow R1 direction, and the mold cavity part 20a opens in an arrow R2 direction. The mold core part 100a and the mold cavity part 20a have been removed from the flexible unit 2102. Then, the flexible gear 100 and the shaft 2002 are joined to produce the flexible gear unit 2102. Note that, as described in FIGS. 10 and 11, the flexible gear 100 includes the gear part 101, the body part 102, and the diaphragm part 103 in a body also in FIG. 12.

FIG. 13 is a cross-sectional view showing the arrangement of the flexible gear 100 produced by the method of manufacturing the flexible gear according to any one of the first to fourth embodiments of the present technology, a mold core part 100b, a mold cavity part 40a, a mold semicircular split mold part 100c, and a mold semicircular split mold part 100d. A mold interior 40 for the hub includes the mold core part 100b, the mold cavity part 40a, the mold semicircular split mold part 100c, and the mold semicircular split mold part 100d. The mold core part 100b and the mold semicircular split mold part 100c are joined together along a parting line Q1. The mold core part 100b and the mold semicircular split mold part 100d are joined together along a parting line Q2. The mold cavity part 40a and the mold semicircular split mold part 100c are joined together along a parting line Q3. The mold cavity part 40a and the mold semicircular split mold part 100d are joined together along a parting line Q4. The hub is molded in conformance with the shape of the mold interior 40 for the hub. As shown in FIG. 13, the flexible gear 100 includes the gear part 101, the body part 102, and the diaphragm part 103 in a body. Furthermore, the central hole 104 formed in the diaphragm part 103 is disposed in the mold interior 40. An injection part 30 filled with resin or the like 31 is connected to a rightmost portion of the mold interior 40 in FIG. 13.

FIG. 14 is a cross-sectional view showing that the resin or the like 31 has been injected from the injection part 30 into the mold interior 40 for the hub. In FIG. 14, the mold core part 100b and the mold semicircular split mold part 100c remain joined together along the parting line Q1 and are not open. The mold core part 100b and the mold semicircular split mold part 100d remain joined together along the parting line Q2 and are not open. The mold cavity part 40a and the mold semicircular split mold part 100c remain joined together along the parting line Q3 and are not open. The mold cavity part 40a and the mold semicircular split mold part 100d remain joined together along the parting line Q4 and are not open. A hub 3001 is molded in the mold interior 40. Furthermore, as described in FIG. 13, the flexible gear 100 includes the gear part 101, the body part 102, and the diaphragm part 103 in a body also in FIG. 14.

FIG. 15 is a cross-sectional view showing that the mold core part 100b, the mold cavity part 40a, the mold semicircular split mold part 100c, and the mold semicircular split mold part 100d have opened, and a flexible gear unit 3102 including the flexible gear 100 and the hub 3002 has been produced. As shown in FIG. 15, starting from the parting lines Q1 to Q2 (not shown), the mold core part 100b opens in an arrow S1 direction. Starting from the parting lines Q1 and Q3 (not shown), the mold semicircular split mold part 100c opens in an arrow S2 direction. Starting from the parting lines Q3 and 04 (not shown), the mold cavity part 40a opens in an arrow S3 direction. Starting from the parting lines Q2 and Q4 (not shown), the mold semicircular split mold part 100d opens in an arrow S4 direction. The mold core part 100b, the mold cavity part 40a, the mold semicircular split mold part 100c, and the mold semicircular split mold part 100d have been removed from the flexible gear unit 3102. Then, the flexible gear 100 and the hub 3002 are joined to produce the flexible gear unit 3102. Note that, as described in FIGS. 13 and 14, the flexible gear 100 includes the gear part 101, the body part 102, and the diaphragm part 103 in a body also in FIG. 15.

8. Seventh Embodiment (Example of Gear)

A gear according to a seventh embodiment (an example of a gear) of the present technology is a gear that includes a gear part, a body part, and a diaphragm part, includes a material suitable for an electroforming method, and has flexibility. Examples of the material suitable for the electroforming method include the electroforming materials shown in FIG. 2 described above, gold, silver, copper, iron, an alloy of nickel and phosphorus, etc. Furthermore, the material suitable for the electroforming method may be a laminated material. An example is a laminated material including nickel in a surface layer, copper in an intermediate layer, and nickel in a lowermost layer. This laminated material has the effect that an intermediate portion is soft and has excellent spring properties, and the surface layer is hard and has excellent wear resistance. Furthermore, as the material suitable for the electroforming method, for example, a dense and defect-free plating layer produced by electroless nickel plating is also included.

The gear according to the seventh embodiment of the present technology allows a further improvement in productivity and a further reduction in production cost.

The diaphragm part included in the gear according to the seventh embodiment of the present technology may have an uneven shape. Here, the uneven shape is a concept including both an uneven shape and a hole shape.

9. Eighth Embodiment (Example of Flexible Gear Manufacturing Apparatus)

A flexible gear manufacturing apparatus according to an eighth embodiment (example of a flexible gear manufacturing apparatus) of the present technology is a manufacturing apparatus that includes a matrix preparation unit that prepares a matrix with a flexible gear shape, and a flexible gear shape formation unit that forms, by an electroforming method using the matrix, a flexible gear shape with predetermined thickness from a plating solution of a material suitable for the electroforming method, and releases the flexible gear shape from the matrix.

The flexible gear manufacturing apparatus according to the eighth embodiment of the present technology allows a further improvement in productivity and a further reduction in production cost.

Note that embodiments of the present technology are not limited to the above-described embodiments, and various modifications can be made without departing from the scope of the present technology.

Furthermore, the effects described in the present disclosure are merely examples and nonlimiting, and other effects may be included.

Furthermore, the present technology can also take the following configurations.

[1]
A method of manufacturing a flexible gear including:
preparing a matrix with a flexible gear shape; and
forming, by an electroforming method using the matrix, a flexible gear shape with predetermined thickness and releasing the flexible gear shape from the matrix.

[2]
The method of manufacturing the flexible gear according to [1], in which the preparation of the matrix includes producing the matrix by machining.

[3]
The method of manufacturing the flexible gear according to [1], in which the preparation of the matrix includes producing the matrix by replication of a model.

[4]
The method of manufacturing the flexible gear according to [3], in which the replication uses an injection molding method.

[5]
The method of manufacturing the flexible gear according to [3], in which the replication uses an electroforming method.

[6]
The method of manufacturing the flexible gear according to any one of [1] to [5], in which the matrix includes recessed portions corresponding to teeth of the flexible gear, and the teeth of the flexible gear are formed by filling the recessed portions with a plating solution.

[7]
The method of manufacturing the flexible gear according to [6], in which a cross-sectional shape of each recessed portion cut along a recessed direction of the recessed portion is a substantially triangular shape.

[8]
The method of manufacturing the flexible gear according to any one of [1] to [7], in which the matrix is subjected to conductive treatment.

[9]
The method of manufacturing the flexible gear according to any one of [1] to [8], in which the matrix is subjected to masking treatment.

[10]
The method of manufacturing the flexible gear according to any one of [1] to [9], in which the matrix is made from a metallic material, and a release layer is formed on a surface of the matrix on which the flexible gear shape is formed.

[11]
The method of manufacturing the flexible gear according to any one of [1] to [9], in which the matrix is made from a nonmetallic material, and a conductive layer is formed on a surface of the matrix on which the flexible gear shape is formed.

[12]
A method of manufacturing a flexible gear unit including:
the method of manufacturing the flexible gear according to any one of [1] to [11]; and
joining a shaft and/or a hub to the flexible gear.

[13]
The method of manufacturing the flexible gear unit according to [12], in which the joining uses an insert injection molding method.

[14]
A gear including a gear part, a body part, and a diaphragm part,
the gear being made from a material suitable for an electroforming method, and having flexibility.

[15]
The gear according to [14], in which the diaphragm part has an uneven shape.

REFERENCE SIGNS LIST

100 Flexible gear
101 Gear part
102 Body part
103 Diaphragm part
200, 800, 1100 Matrix
400, 600 Model
2000, 2001, 2002 Shaft
300, 3001, 3002 Hub
2100, 2102, 3100, 3102 Flexible gear unit

The invention claimed is:
1. A method of manufacturing a flexible gear, the method comprising:
preparing a matrix with a shape of the flexible gear, wherein the matrix includes:
an annular gear portion having internal teeth; and
a cylindrical body portion continuous with the annular gear portion;
forming, by an electroforming method using the matrix, the flexible gear with a determined thickness on an inside of the matrix, wherein
the flexible gear includes a gear part and a body part, and the formation of the flexible gear comprises:
- depositing an electroforming material on the annular gear portion and the cylindrical body portion of the matrix; and
- increasing a film thickness of the deposited electroforming material on the annular gear portion until an inner diameter of the gear part of the flexible gear is same as an inner diameter of the body part of the flexible gear; and
- releasing the flexible gear shape from the matrix.

2. The method of manufacturing the flexible gear according to claim 1, wherein the preparation of the matrix includes producing the matrix by a machining process.

3. The method of manufacturing the flexible gear according to claim 1, wherein the preparation of the matrix includes producing the matrix by replication of a model.

4. The method of manufacturing the flexible gear according to claim 3, wherein the replication uses an injection molding method.

5. The method of manufacturing the flexible gear according to claim 3, wherein the replication uses an electroforming method.

6. The method of manufacturing the flexible gear according to claim 1, wherein
- the matrix includes a plurality of recessed portions corresponding to teeth of the flexible gear, and
- the teeth of the flexible gear are formed by filling the plurality of recessed portions with a plating solution.

7. The method of manufacturing the flexible gear according to claim 6, wherein a cross-sectional shape of each recessed portion of the plurality of recessed portions cut along a recessed direction of a respective recessed portion is a substantially triangular shape.

8. The method of manufacturing the flexible gear according to claim 1, wherein the matrix is subjected to a conductive treatment.

9. The method of manufacturing the flexible gear according to claim 1, wherein the matrix is subjected to a masking treatment.

10. The method of manufacturing the flexible gear according to claim 1, wherein
- the matrix is made from a metallic material, and
- the method further comprises forming a release layer on a surface of the matrix on which the flexible gear is formed.

11. The method of manufacturing the flexible gear according to claim 1, wherein
- the matrix is made from a nonmetallic material, and
- the method further comprises forming a conductive layer on a surface of the matrix on which the flexible gear is formed.

12. A method of manufacturing a flexible gear unit comprising: the method of manufacturing the flexible gear according to claim 1; and joining a shaft and/or a hub to the flexible gear.

13. The method of manufacturing the flexible gear unit according to claim 12, wherein the joining uses an insert injection molding method.

* * * * *